(12) United States Patent
Hjalmtysson

(10) Patent No.: US 6,392,996 B1
(45) Date of Patent: May 21, 2002

(54) METHOD AND APPARATUS FOR FRAME PEEKING

(75) Inventor: Gisli Hjalmtysson, Gillette, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/058,561

(22) Filed: Apr. 13, 1998

(51) Int. Cl.$^7$ .............................................. H04L 12/54
(52) U.S. Cl. ...................................... 370/252; 370/235
(58) Field of Search ................................ 370/230, 235, 370/236, 252, 392, 395, 400, 401, 389, 390, 432, 352, 395.5, 395.51, 395.52; 709/223, 224, 225, 232, 233, 235

(56) References Cited

U.S. PATENT DOCUMENTS

| | | | |
|---|---|---|---|
| 5,568,478 A | * 10/1996 | Van Loo, Jr. et al. | 370/390 |
| 5,610,905 A | * 3/1997 | Murthy et al. | 370/401 |
| 6,032,190 A | * 2/2000 | Bremer et al. | 709/238 |
| 6,101,187 A | * 8/2000 | Cukier et al. | 370/396 |

OTHER PUBLICATIONS

Sally Floyd and Van Jacobson, "Randon Early Detection Gateways for Congestion Avoidance", Aug., 1993, vol. 1, No. 4, pp. 397–413.

Nikos G. Aneroussis, Aurel A. Lazar and Dimitrios E. Pendarakis, Taming Xunet III, Jul., 1995, Computer Communication Review, vol. 25, No. 3, pp. 44–65.

Aurel A. Lazar, Shailendra K. Bhonsle, and Koon–Seng Lim, "A Binding Architecture for Multimedia Networks", Nov. 1, 1995, Journal of Parallel and Distributed Computing, pp. 204–216.

David L. Tennenhouse and David J. Wetherall, Telemedia, "Towards an Active Network Architecture," Apr. 1996, Computer Communication Review, vol. 26, No. 2, pp. 5–18.

Danny J. Mitzel, Deborah Estrin, Scott Shenker, Lixia Zhang, "An Architectural Comparison of ST–II and RSVP," IEEE INFOCOM '94, Proceedings, Jun. 12–16, 1994, vol. 2, pp. 6a.3.1–6a3.10.

Lixia Zhang, Stephen Deering, Deborah Estrin, Scott Shenker, and Daniel Zappala, "RSVP: A New Resource Reservation Protocol," IEEE Network, Sep. 1993, vol. 7, No. 5, pp. 8–18.

* cited by examiner

Primary Examiner—Ricky Ngo
(74) Attorney, Agent, or Firm—Kenyon & Kenyon

(57) ABSTRACT

A system for frame peeking at a node of a data network includes a controller, a forwarding engine and an interface. The interface includes a subscribe/publish interface for allowing the controller to request (or subscribe) to receive a selected portion of a flow (a group of packets), and a facility access interface for allowing the controller to control each frame or packet. By providing only a selected portion of received packets to the controller rather than the entire packet, the controller can operate on the incoming data without significantly degrading the forwarding performance of the system. Frame peeking can also be used in an end-system to minimize packet processing.

26 Claims, 2 Drawing Sheets

METHOD AND APPARATUS FOR FRAME PEEKING

BACKGROUND OF THE INVENTION

The present invention relates to data networks, and more particularly, to a method and apparatus for peeking at a portion of a frame or packet rather than the full packet.

Computer networks can be managed using a variety of techniques. Increasingly, it is becoming more desirable to actively manage computer networks, for example, to provide consistent service quality. However, in order to actively manage computer networks in an effective manner, systems must typically operate in the data path. In other words, systems must operate on the data packets to be forwarded. However, by operating on the packets to be forwarded, added delay is introduced in the packet forwarding process which can exacerbate network congestion.

FIG. 1 illustrates a system 10 located at a node of a data network. FIG. 1 illustrates an example of a system that operates in the data path. System 10 includes a controller 12 for controlling the operation of system 10, a forwarding engine 14 for forwarding packets received on line 18. Packets are output (forwarded) via line 20. Controller 12 and forwarding engine 14 can communicate via interface lines 16. Congestion is a common problem in data networks. Congestion occurs when there is more data to be carried over the network than the network can support.

There are several congestion control techniques that can be used to decrease network congestion. One common technique used to decrease network congestion is to discard packets. Because some packets have a higher priority or a greater importance than other packets, it may desirable to selectively discard certain packets over others. However, each of the packets must be analyzed to determine whether the packet should be discarded or forwarded.

Referring to the system of FIG. 1, a group of packets are input to forwarding engine 14 via line 18. The received packets are stored in a buffer 15 and then routed via path 21 to controller 12. At the application level, the packets can be analyzed by controller 12 to determine which packets should be discarded and which packets should be forwarded. The packets can be analyzed based upon application semantics. The packets are then each copied back to buffer 15 of forwarding engine 14 for forwarding on line 20.

While this selective discard technique can decrease congestion and loss in utility due to congestion, this technique can also increase the delay in the forwarding process. The critical forwarding path of the network is the data path which is input on line 18 and is output on line 20. A significant delay is introduced by moving each of the packets along path 21 from buffer 15 of forwarding engine 14 to the controller 12 and then back to buffer 15. This delay is very significant because the interface between controller 12 and forwarding engine 14 has a very limited bandwidth.

Moreover, in an Asynchronous Transfer Mode (ATM) network, controller 12 operates on application level frames, which can include many ATM cells. Therefore. in an ATM network, the ATM cells received on line 18 must typically be reassembled into application level frames. After the cells are reassembled into an application level frame, controller 12 can then analyze the data to determine whether the cells should be discarded or forwarded. The application level frame must then be segmented back into the separate ATM cells before moving the individual cells back to buffer 15 in forwarding engine 14. This reassembly and segmentation process further slows the forwarding task that must be performed by system 10.

System 10 of FIG. 1 can improve reception quality during congestion by operating in the data path to selectively discard less important packets and forward more important packets. However, this is done at the price of a significant delay incurred through the data path 21 that is routed through controller 12. There are many additional examples in which a data network can be actively managed by operating in the data path. As described above, fully operating in the data path can improve network control, but also significantly degrades forwarding performance of the system. Therefore, there is a need for a technique to operate on data in the data path without significantly degrading the forwarding performance of the system.

SUMMARY OF THE INVENTION

The present invention includes a method and apparatus for frame peeking that enables a controller to operate on data in the data path without significantly degrading the forwarding performance of the system. According to an embodiment of the present invention, the system includes a controller, a forwarding engine for forwarding packets, and an interface interconnecting the controller and the forwarding engine. The interface includes a subscribe/publish interface and a facility access interface. The subscribe interface allows the controller to request (subscribe) to receive a selected portion of a packet or packets of a flow. The publish interface allows the forwarding engine to publish the requested data to the controller. The facility access interface allows the controller to control packets stored in a buffer of the forwarding engine.

After the controller has subscribed to receive a portion of a packet, a copy of the portion of the received packet is provided to the controller. The controller may then analyze the received portion of the packet to determine how the packet should be controlled. The controller can then use the facility access interface to control the packet (e.g., discard or block the packet, reschedule the forwarding of the packet, allow the packet to be forwarded normally). Therefore, because only a selected portion of a packet is provided to the controller, the controller can operate on the data without significantly degrading the forwarding performance of the system.

In addition, frame peeking can be used at an end-system to reduce the number of copies that are made of a packet in memory and improve packet processing efficiency. In traditional layered data retrieval, two copies of a received packet must be made in memory. The end-system must first copy the packet into kernel memory and then determine which portion of user or application memory should receive the packet. The packet is then copy from kernel space into the specific user memory space. Thus, two copies must be made, thereby, creating additional packet processing and delay. According to an embodiment of the present invention, the end-system includes an interface card for receiving packets, a processor or controller and memory. The controller requests or subscribes to receive a portion of packets received at the interface card. Packets are received at the interface card and a portion of requested packets are provided to the controller. The controller identifies a location to store the packet in memory based on the portion of the packet. The packet is then stored in memory at the identified location. Thus, according to an embodiment of the present invention, only one copy of the packet is made in memory.

DETAILED DESCRIPTION

Figure 1:
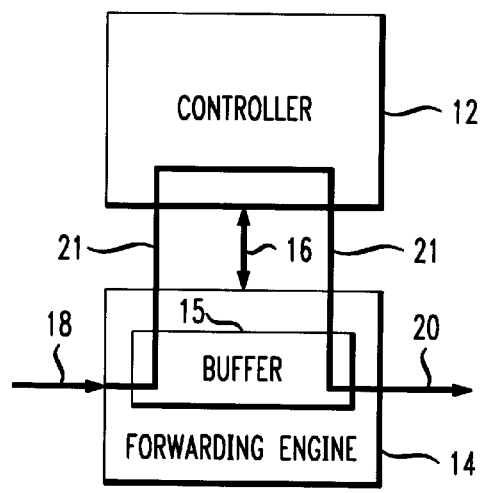
FIG. 1 illustrates a system located at a node of a data network.
Figure 2:
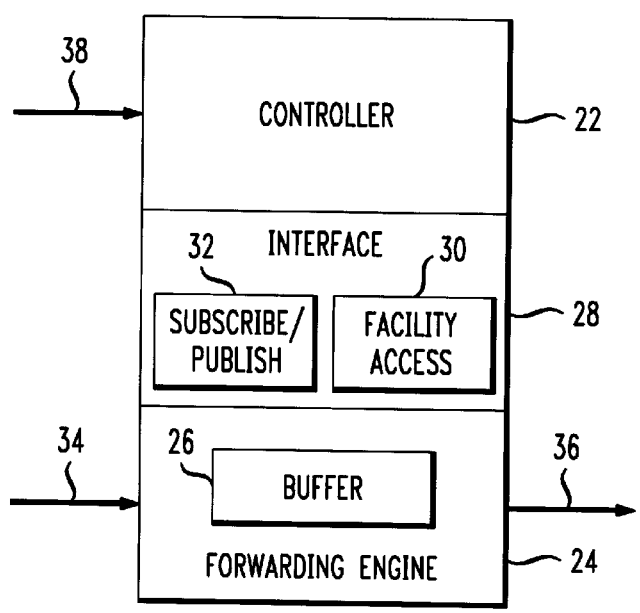
FIG. 2 illustrates a system located at a node of a data network according to an embodiment of the present invention.

Referring to the drawings in detail, wherein like numerals indicate like elements, FIG. 2 illustrates a system at a node of a data network according to an embodiment of the present invention. System 20 in FIG. 2 includes a controller 22 for controlling operation of system 20, and a forwarding engine 24 for forwarding packets input on line 34 to other nodes via output line 36. System 20 can be implemented in hardware and/or software. The packets can include Internet Protocol (IP) packets, Asynchronous Transfer Mode (ATM) application level frames (such as ATM Adaptation Layer frames) or the like. Control signals are input to controller 22 via line 38 and may be provided on a separate signaling connection, but may also be in-band. Forwarding engine 24 also includes a buffer 26 for storing packets input via line 34.

An interface 28 couples controller 22 to forwarding engine 24. Interface 28 includes a subscribe/publish interface 32 and a facility access interface 30. The subscribe/publish interface 32 allows controller 22 to subscribe to request a predetermined portion of specific packets from forwarding engine 24, and allows forwarding engine 24 to publish or send the requested portion of the packet to controller 22. Facility access interface 30 allows controller 22 to control the forwarding of the received packets. Interfaces 30 and 32 are described in greater detail below. A data network includes many nodes, where each node can include a system 20.

System 20, according to an embodiment of the present invention, provides a mechanism for frame-peeking that enables controller 22 to peek at a portion of a requested packet. This frame-peeking mechanism enables controller 22 to only peek at parts of each requested packet as opposed to having to be fully in the data path. As a result, the frame-peeking mechanism of the present invention improves forwarding efficiency by reducing the amount of data routed through controller 22 (e.g., limiting bandwidth needs of controller 22) and by avoiding removing or copying the packet from the buffer 26 of forwarding engine 24. Moreover, an ATM switch may support frame-peeking without performing reassembly and segmentation of the full application level frame. In an IP router, packet-peeking limits the bandwidth from a kernel router located in the forwarding engine 24 to the flow controller at controller 22.

One of the benefits of interface 28 is that controller 22 may dynamically change the volume of data that goes through it. For example, during congestion, controller 22 may perform a selective discard of selected packets. Initially, controller 22 may subscribe only to the flow statistics until buffer 26 fills up to a predetermined level of fullness (indicating the onset of congestion) at which time controller 22 starts peeking at the application level frames (e.g., subscribes to a portion of the frames or packets). By peeking at the incoming packets, controller 22 can then selectively discard the less important packets using facility access interface 30. Because only a small portion of the data is copied to the controller 22, the volume of data going through controller 22 is minimal. In this manner, controller 22 can operate on the data without being fully in the data path.

According to an embodiment of the present invention, controller 22 can request (or subscribe) to peek into a particular group of packets of interest. Each group of packets is defined as a flow. According to an embodiment of the present invention, a flow is one or more packets satisfying an equivalence relation. Typically, a flow can be identified by a common sequence of bits (i.e., a common bit pattern) in each packet. A wide variety of bit sequences can be used for flow identification. For example, in a connection oriented network, such as an ATM network, a flow can be, for example, the group of ATM cells or application level frames corresponding to the ATM connection. ATM, for example, allows for the flow (or connection) to be identified by information in the application level frame, such as part of an RTP frame. in a connectionless network, such as IP, a flow can be a group of packets or datagrams that are associated with each other. For example, a flow can include all IP packets from a specific IP address, or directed to a specific IP address, or having a predetermined prefix in the IP destination address (e.g., all packets directed to England). IP version 6 (IPv6) even provides a "flow label" for identifying flows of packets or IP datagrams. In IP, a predetermined IP option can be used in a group of packets to identify a flow. A flow could also include, for example, packets providing data of a particular type, such as MPEG-4 video packets. In such case, the type of data (e.g., MPEG-4 video) carried in the packet payload may be identified in the application level header in the payload.

The subscribe/publish interface 32 allows controllers to subscribe to (request) events and information to be published (on request) by forwarding engine 24. According to an embodiment of the present invention, subscribe/publish interface 32 includes three primitives (or commands) that allows controller 22 to subscribe (or request) to receive packet information, and a primitive or command that allows the forwarding engine 24 to publish or provide the requested information to controller 22. The Subscribe primitives include:

Subscribe-Stats(flow identifier)—requests a subscription to simple flow statistics, such as number of packets and bytes transmitted since last invocation, or the number of bytes (or packets) currently in the buffer 26 using the subscribe-stats primitive. If the flow identifier is set to 0, the controller 22 receives nodal statistics about buffer length and packet loss rate.

Subscribe-Peek(flow identifier, offset, length)—implements frame peeking according to an embodiment of the present invention, allowing controller 22 to subscribe to receive (peek at) a portion of requested packets. Subscribe-peek does not cancel subscription to statistics. Offset—is the offset where peeking is to begin within the payload of the packet. Length—is the number of bytes to peek at, with 0 indicating all.

Subscribe-Ignore(flow identifier)—cancels all subscriptions.

The Publish interface includes at least one primitive:

Publish(flow identifier, packet reference, requested data)—this is used by the forwarding engine 24 to publish the peek event, including the data subscribed or requested by the controller 22. A publish message (or published peek event) is issued by forwarding engine 24 to controller 22. The published peek event contains a flow identifier identifying the flow for the packet, a packet reference identifying the packet and a copy of the data from the packet (that was earlier requested or subscribed to by controller 22). The packet reference may be used by controller 22 to manipulate the packet through facility access interface 30, as described in greater detail below.

A controller can subscribe to particular packet data for one or more different flows. Therefore, where a single controller 22 is used for multiple flows, a flow identifier is necessary in each publish message. However, as with all of the primitives described herein, the publish primitive can be implemented in a variety of ways. For example, there may be several controllers 22 within system 20, wherein each controller 22 only monitors a single flow. In such a case, identification of the flow can be provided implicitly from forwarding engine 24 (rather than explicitly) because there is only one controller 22 for each flow.

Facility access interface 30 provides controller 22 with access to the resources of forwarding engine 24. Facility access interface 30 is used by controller 22 to manipulate data flow. Some of the facility access primitives according to an embodiment of the present invention are listed below.

The Facility Access Interface 30

Actions on flows (implicit argument: flow identifier):

I) Forwarding

Iblock(subset of input ports): blocks input on the subset of ports specified. Arriving packets on these ports are discarded. Blocking is removed on a port by excluding that port from the subset of a subsequent block.

Oblock(subset of output ports): blocks output on the subset of ports specified. Blocking is removed on a port by excluding that port from the subset of a subsequent block.

Delay(Δ-time, subset of output ports): schedules arriving packets for forwarding at least Δ-time units after arrival, on the subset of ports specified.

Actions on individual packets (implicit argument: packet reference):

Release-at(time, subset of output ports): schedules packet for departure on the subset of output ports specified.

Block(subset of output ports): blocks packet on the subset of output ports specified.

Discard( ): discards the packet, and removes it from the flow buffer.

Controller 22 can control packets via facility access interface 30. Controller 22 can control flows or individual packets. At the flow level, controller 22 can block packets on input ports or on output ports, or can schedule arriving packets of a flow for a delayed output. Controller 22 can similarly block or delay the output of individual packets using a packet reference to identify each packet to be blocked or delayed. On connection oriented hardware (e.g., an ATM switch), these primitives would manipulate virtual circuit (VC) tables, whereas in a connectionless router (e.g., an IP router), an output port is blocked. Therefore, controller 22 can control the fate of each packet entering forwarding engine 24 without being fully in the data path. Controller 22 can discard an individual packet, reschedule (delay) the transmission of a packet, or can do nothing and allow the packet to be forwarded normally by forwarding engine 14. In contrast to an in-data-path solution, this set of primitives supports flow level connectivity management without being fully in the data-path.

Figure 3:
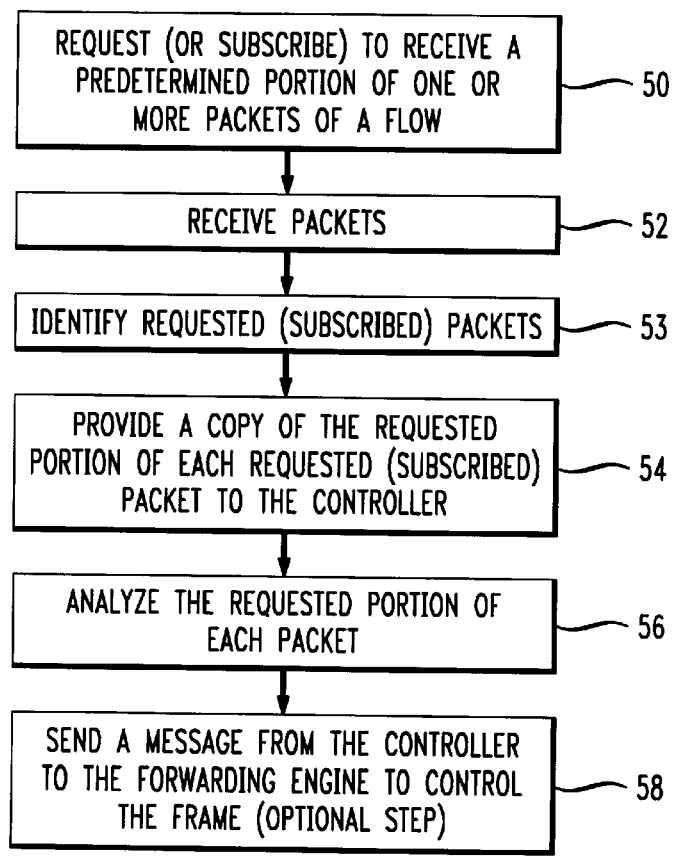
FIG. 3 is a flow chart illustrating the operation of the system of FIG. 2 according to an embodiment of the present invention.

The operation of System 20 will now be described with reference to FIG. 3. FIG. 3 is a flow chart illustrating the operation of system 20 according to an embodiment of the present invention.

At Step 50, controller 22 requests (or subscribes) to receive a pre-determined portion of packets corresponding to a particular flow. Controller 22 can subscribe to receive (peek-at) a portion of the incoming packets of an identified flow using the Subscribe-Peek primitive or command, or other technique. The flow identifier argument of the Subscribe-Peek command can be used to identify the flow (the group of packets of interest). The flow identifier argument can identify a flow using a variety of different bit sequences in each packet (e.g., IP packets directed to a specified IP address, packets having a specific IPv6 "flow label", a flow identification provided as a predetermined IP option, an ATM VPI/VCI, header or other information identifying or classifying the data in the payload). The offset argument identifies the number of bytes or bits offset from the beginning of the packet where the peeking shall begin, and the length argument identifies the number of bytes to be provided to the controller 22.

At step 52, packets are received at forwarding engine 24 and stored in buffer 26.

At step 53, forwarding engine 24 identifies the requested or subscribed packets. In other words, forwarding engine 24 identifies received packets that are part of the flow to which the peek-subscription applies. This can be performed by analyzing each packet received by forwarding engine 24. For example, forwarding engine 24 can identify the requested packets by comparing a predetermined sequence of bits (e.g., the IP address for the destination, or the IPv6 flow label, or header information) in each packet with the flow identifier provided from controller 22. A match indicates that the packet is part of the flow which has been subscribed to or requested by controller 22.

At step 54, a copy of the subscribed (requested) portion of each identified packet is provided with a packet reference from forwarding engine 24 to controller 22. This can be done using the publish primitive, described above, or using another technique. For example, the forwarding engine 24 can interrupt the controller when a packet of the subscribed flow is received (and the requested portion is available). Alternatively, the controller 22 can periodically poll the forwarding engine 24 and request to receive any portions of packets the controller 22 previously subscribed.

For step 54, according to an embodiment of the present invention, forwarding engine 24 uses the offset and length arguments (provided in the Peek-Subscribe message or primitive from controller 22) to identify the beginning and length of the portion of the packet of interest. The offset can be provided relative to the start of a packet or frame or relative to the start of a header (for some types of packets these two are the same). This portion of the packet is then copied and placed in a Publish message that also includes the flow identifier (optional) and a packet reference. The flow identifier is the same as that provided by controller 22 (or a reference to that flow identifier). The packet reference is assigned by forwarding engine 24 and may indicate, for example, a packet number (e.g., packet number 17). The Publish message is then sent from forwarding engine 24 to controller 22. Therefore, it can be seen that, rather than routing the entire packet from the buffer 26 to controller 22, only the selected (subscribed) portion of the received packet and a packet reference (identifying the packet) is provided to controller 22. This minimizes the amount of data passing through controller 22 and avoids degradation of the packet forwarding process.

At Step 56, controller 22 analyzes the received portion of the packet to determine how the packet should be controlled (and even if the packet should be controlled at all). For example, controller 22 can analyze the portion of the packet and determine that the packet stored in buffer 26 is a low priority packet and should be discarded due to high congestion.

At Step 58, if controller 22 determines that the packet should be controlled, controller 22 issues a command with a packet reference identifying the packet to forwarding engine 24 to indicate how the packet should be controlled or manipulated. This can be done, for example, via facility access interface 30. For example, if controller 22 determines that, based on the received portion of the packet, the packet is a low priority and should be discarded, the discard primitive can be used by controller 22 to instruct forwarding engine 24 to discard the packet. Controller 22 can issue many other types of messages or commands to forwarding engine 24 to control the packet stored in buffer 26.

The frame peeking technique of the present invention can be applied to nodes (e.g., a router) in a network to improve forwarding performance. In addition, the frame peeking technique of the present invention can also be applied to end-systems to improve efficiency in packet processing. Currently, end-systems (such as a user's personal computer or PC) include an interface card (e.g., Ethernet card with memory), a processor and main memory. When a packet is received and stored by the interface card, the interface card issues an interrupt to the processor. The packet is then copied into kernel memory. The processor then analyzes the packet stored in kernel memory to determine its destination (user application). There may be one or more user applications currently running on the end-system that are receiving packets. After analyzing the packet, the packet is then copied again into into user memory for the user application. Thus, the end-system must make two copies of the packet in main memory, causing additional delay.

Figure 4:
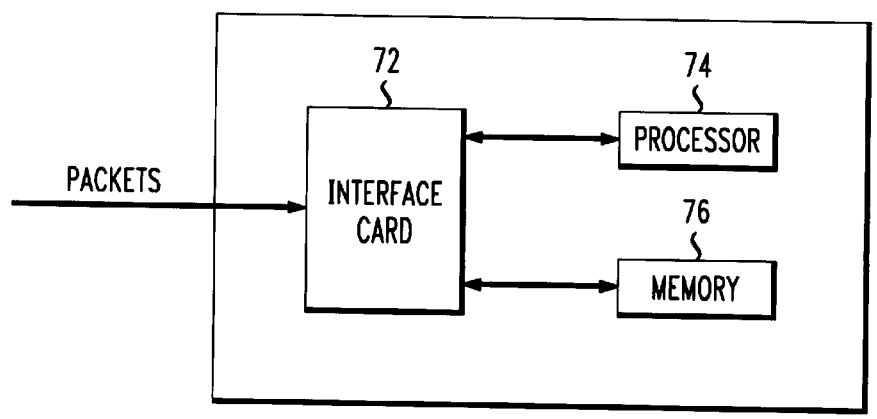
FIG. 4 illustrates a computer system operating as an end-system according to an embodiment of the present invention.

According to an embodiment of the present invention, frame peeking can be used at an end-system to avoid making two full copies of the packet in memory. FIG. 4 illustrates a computer system operating as an end-system. Computer system 70 includes an interface card 72, a processor 74 and memory 76. Processor 74 issues a subscribe-peek command to interface card 72 identifying the portion of the specific packets that processor 74 would like to receive (peek), as described above. The packets are received and identified by the interface card 72 as part of the flow that is subscribed or requested by the processor 74. The designated portion (e.g, indicated by offset and length arguments) of the packet is copied by interface card 72 and forwarded to processor 74 along with a packet reference. The portion of the packet (and possibly the packet reference) is then stored by processor 74 in kernel space of memory 76. Processor 74 then analyzes the stored portion of the packet to determine where the (complete) packet should be stored in memory 76 (e.g., in which user space the packet should be stored). Processor 74 then issues a store command with the packet reference to the interface card 72 to request a copy of the complete packet. Processor 74 receives and then identifies the packet based on the packet reference and then stores the packet in the identified user space in memory. This avoids making two full copies of the packet in main memory, reducing processing time.

The present invention includes a method and apparatus for frame peeking that operates on data in the data path without significantly degrading the forwarding performance of the system. According to an embodiment of the present invention, system 20 includes a controller 22 for controlling the system and a forwarding engine 24 for forwarding packets. Interface 28 interconnects controller 22 and forwarding engine 24. Interface 28 includes a subscribe/publish interface 32 and a facility access interface 30. The subscribe/publish interface 32 allows controller 22 to request (subscribe) to receive a selected portion of packets input to forwarding engine 24. The facility access interface 30 allows controller 22 to control packets stored in buffer 26 of forwarding engine 24.

After controller 22 has subscribed to receive a portion of a packet, a copy of the requested portion of the received packet is provided to controller 22. Controller 22 then analyzes the received portion of the packet to determine how the packet should be controlled. Controller 22 may then use the facility access interface 30 to control the packet. Unlike previous techniques, the entire packet or flow is not routed to controller 22 for analysis. In this manner, controller 22 can operate on the data without being fully in the data path. Accordingly, network control can be improved by operating on the data without degrading forwarding performance of the system. Moreover, in an ATM network, reassembly and segmentation are unnecessary because only a small portion of an ATM cell or application level frame is provided from forwarding engine 24 to controller 22, rather than the entire ATM cell or application level frame.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, interface 28 provides merely one example of how controller 22 and forwarding engine 24 can communicate to perform frame-peeking. There are many other ways to provide communication between controller 22 and forwarding engine 24.

What is claimed is:

1. A method of peeking into a portion of a packet received at a system in a data network, the system including a receiving section and a control section, said method comprising the steps of:

receiving a plurality of packets at the receiving section of the system;

selecting one of said received packets;

copying a portion of the selected packet;

providing the copied portion of the selected packet to the control section of the system; and the control section issuing a request message to the.receiving section that requests to receive a portion of each of a group of packets received at the receiving station, the request message identifying the group of packets and the portion of each packet.

2. The method of claim 1 and further comprising the steps of:

analyzing the copied portion of the packet; and controlling forwarding of the packet based on said step of analyzing.

3. The method of claim 1 wherein said step of the control section issuing a request comprises the step of the control section issuing a request message to the receiving section identifying the packet and a length and offset.

4. The method of claim 1 wherein said request message identifies the group of packets using a common sequence of bits in each packet.

5. The method of claim 1 wherein said group of packets each satisfies an equivalence relation, said group of packets comprising a flow.

6. The method of claim 4 wherein said common sequence of bits comprises a flow identifier for identifying a flow, said flow comprising the group of packets.

7. The method of claim 4 wherein said common sequence of bits comprises an IPv6 flow label.

8. The method of claim 4 wherein said common sequence of bits comprises at least a portion of an address.

9. The method of claim 4 wherein said common sequence of bits comprises an IP option.

10. The method of claim 4 wherein said common sequence of bits comprises a portion of a packet header.

11. The method of claim 4 wherein said packet comprises an Internet Protocol (IP) packet.

12. The method of claim 1 wherein said packet comprises an ATM frame.

13. The method of claim 1 wherein said packet comprises a plurality of ATM cells.

14. The method of claim 1 wherein said control section comprises a controller and said receiving section comprises a forwarding engine.

15. The method of claim 1 wherein said step of providing comprises the step of providing the copied portion of the selected packet and a packet identifier to the control section of the system.

16. The method of claim 1 wherein said step of providing comprises the step of providing the copied portion of the selected packet and a packet identifier to the control section of the system for controlling or manipulating the packet.

17. The method of claim 1 and further comprising the steps of:
analyzing the requested portion of the packet; and
identifying a location in memory to store the packet.

18. The method of claim 17 and further comprising the steps of:
receiving the packet;
storing the packet at the identified location in memory.

19. A method of peeking into a portion of one or more packets of a flow for controlling the forwarding of the packets, the method comprising the steps of:
sending a request message from a controller to a forwarding engine to request a portion of each packet of a flow received at the forwarding engine, the request message identifying the flow and the portion of each packet;
receiving at the forwarding engine one of the packets corresponding to the flow;
storing the received packet;
identifying that the received packet corresponds to the flow;
sending a copy of the portion of the identified packet from the forwarding engine to the controller for controlling forwarding of the packet;
identifying a location in memory to store the identified packet based on said portion of the identified packet;
sending the identified packet to the controller; and
storing the identified packet at the identified location in memory.

20. A method of peeking into a portion of one or more packets of a flow for controlling the storing of the packets, the method comprising the steps of:
sending a request message from a controller to an interface to request a portion of each packet of a flow received by the interface, the request message identifying the flow and the portion of each packet;
receiving at the interface one of the packets corresponding to the flow;
storing the received packet in the interface;
identifying that the received packet corresponds to the flow;
sending a copy of the portion of the identified packet from the interface to the controller for controlling forwarding of the packet;
identifying a location in memory to store the identified packet based on said portion of the identified packet;
sending the identified packet to the controller; and
storing the identified packet at the identified location in memory.

21. The method of claim 20 wherein said controller and interface are located at an end-system.

22. An apparatus at a node for peeking into a portion of a frame comprising:
a controller;
a forwarding engine receiving a plurality of unmodified packets as an input and forwarding the packets under control of the controller;
an interface controller coupling the controller and the forwarding engine, the interface allowing the controller to request a copy from the forwarding engine of a portion of an unmodified packet received by the forwarding engine and allowing the forwarding engine to send the portion of the requested packet from the forwarding engine to the controller; and
wherein said controller comprises a plurality of controllers, each said controller for controlling the forwarding of a different group of packets.

23. The apparatus of claim 22 wherein said interface further allows the controller to control the forwarding of the requested packet based on the received portion of the requested packet.

24. The apparatus of claim 22 wherein said controller comprises a plurality of controllers, each said controller for controlling the forwarding of a different group of packets.

25. A method of peeking into a portion of a packet received at a system in a data network, said method comprising the steps of:
receiving a plurality of packets at a receiving section of the system;
selecting one of said received packets;
copying a portion of the selected packet;
providing the copied portion of the selected packet to a control section of the system; and
receiving a request message from the control section requesting to receive a portion of each of a group of packets received at the receiving station, the request message identifying the group of packets and the portion of each packet.

26. A method of peeking into a portion of a packet received at a system in a data network, said method comprising the steps of:
issuing a request message, from a control section, to a receiving section that receives a plurality of packets;
wherein said request message including a request to:
receive a portion of each of a group of packets received at the receiving section;
select one of said received packets;
copy a portion of the selected packet; and
provide the copied portion of the selected packet to the control section of the system; and
wherein said request message identifying the group of packets and the portion of each packet.

* * * * *